United States Patent Office 3,452,083
Patented June 24, 1969

3,452,083
PREPARATION OF HALO-SUBSTITUTED DIHYDROXYPOLYHYDROMETHANONAPHTHALENE-DICARBOXYLIC ACIDS
Robert A. Dombro, Chicago, Ill., assignor to Universal Oil Products Company, Des Plaines, Ill., a corporation of Delaware
No Drawing. Filed Nov. 3, 1964, Ser. No. 408,673
Int. Cl. C07c 63/38, 51/00, 51/16
U.S. Cl. 260—514                                        6 Claims

ABSTRACT OF THE DISCLOSURE

A halo-substituted 1,4 - dihydroxypolyhydromethano-naphthalenedicarboxylic acid is prepared by condensing furan with maleic anhydride at 0°–200° C., further condensing the resultant epoxy tetrahydrophthalic anhydride with a halo-substituted diolefinic compound, such as hexachlorocyclopentadiene, at 50°–250° C., and treating the resultant halo-substituted polyhydroepoxy methanonaphthalenedicarboxylic compound with an oxygenated acid, such as $H_2SO_4$ or $H_3PO_4$ at 30°–150° C., to form a 1,4-dihydroxypolyhydromethano-2,3 - naphthalenedicarboxylic acid.

---

This invention relates to a process for the preparation of polycyclic dicarboxylic acids which are useful as monomers in the preparation of polyester resins. More particularly, the invention is concerned with a process for preparing certain halo-substituted dihydroxynaphthalene-dicarboxylic acids which will impart desirable physical characteristics to polyester resins.

In the past relatively few years the use of certain polymeric compositions of matter such as plastics and resins has increased to a great degree. In view of the fact that these plastics or resins are replacing materials heretofore used in certain places involving an excessive amount of heat and possible exposure to flame, it is necessary that these synthetic compounds possess the capabilitiy of being able to withstand the aforementioned effects of heat and/or flame. For example, in recent years plastics and resins have been used in architectural paneling, electrical appliances and equipment and in other places where the possibility of contact with an open flame is present. These synthetic materials must therefore posses the desirable physical characteristics of being resistant to flame or retardant to the action of the flame thereon. In addition to the use of these compounds in positions susceptible to flames, plastics and resins have also been used as acoustical sound deadeners in walls or ceilings, as bodies for airplanes, automobiles and boats and for many other uses too numerous to mention here. In all of all aforementioned uses the desirable characteristic of flame retardancy is a desirable characteristic of the synthetic materials.

In this respect the finished synthetic material such as a plastic or resin should contain, as one component thereof, a compound which will impart the aforementioned fire resistancy or flame retardancy to the finished product.

It is therefore an object of this invention to provide a process for preparing compositions of matter which will impart desirable characteristics to plastics or resins.

A further object of this invention is to provide a process for preparing certain halo-substituted polycyclic dicarboxylic acids which, when utilized as a monomer in the preparation of plastics or resins, will impart flame retardancy to the finished product.

In one aspect an embodiment of this invention resides in a process for the preparation of a halo-substituted dihydroxypolyhydromethanonaphthalenedicarboxylic acid which comprises condensing a furan with a compound selected from the group consisting of olefinic dicarboxylic acids and anhydrides thereof at condensation conditions, further condensing the resultant compound with a halo-substituted diolefinic compound at condensation conditions, treating the resultant halo-substituted polyhydroepoxymethanonaphthalenedicarboxylic compound with an oxygenated acid, and recovering the resultant halo-substituted dihydroxypolyhydromethanonaphthalenedicarboxylic acid.

A further embodiment of this invention is found in a a process for the preparation of a halo-substituted dihydroxypolyhydromethanonaphthalenedicarboxylic acid which comprises condensing furan with maleic anhydride at a temperature in the range of from about 0° to about 200° C., further condensing the resultant epoxy tetrahydrophthalic anhydride with a halo-substituted conjugated diolefinic compound at a temperature in the range of from about 50° to about 250° C., treating the resultant halo-substitutde polyhydroepoxymethanonaphthalenedicarboxylic anhydride with an oxygenated acid, and recovering the resultant halo-substituted dihydroxypolyhydromethanonaphthalenedicarboxylic acid.

A specific embodiment of this invention is found in a process for the preparation of a chloro-substituted dihydroxypolyhydromethanonaphthalenedicarboxylic acid which comprises condensing furan with maleic anhydride at a temperature in the range of from about 0° to about 200° C., further condensing the resultant epoxy tetrahydrophthalic anhydride with hexachlorocyclopentadiene at a temperature in the range of from about 50° to about 250° C., thereafter treating the resultant chloro-substituted polyhydroepoxymethanonaphthalenedicarboxylic anhydride with sulfuric acid at a temperature in the range of from about 30° to about 150° C., and recovering the resultant 1,4-dihydroxy-5,6,7,8,9,9-hexachloro - 1,2,3,4,4a, 5,8,8a-octahydro-5,8-methano-2,3 - naphthalenedicarboxylic acid.

Other objects and embodiments will be found in the following further detailed description of this invention.

As hereinbefore set forth, the present invention is concerned with a process for preparing certain compositions of matter which generically may be referred to as halo-substituted dihydroxypolyhydromethanonaphthalenedicarboxylic acids which are useful as monomers in the preparation of plastics and resins. It is also contemplated within the scope of this invention that the acids prepared according to this process may be polymerized to form a polyester, said polyester containing an unsaturated portion which will allow further polymerization initiated by peroxide or air drying. The products which are prepared according to the process of this invention are obtained in a three-step process. The first step of the process involves the reaction of a furan with an olefinic dicarboxylic acid or anhydride thereof. While the preferred heterocyclic compound comprises furan, it is also contemplated within the scope of this invention that substituted furans such as 2-methylfuran, 2,5-dimethylfuran, 2-chlorofuran, 2,5-dichlorofuran, 2-bromofuran, 2,5-dibromofuran, etc. may also be used, although not necessarily with equivalent results. Examples of olefinic dicarboxylic acids or anhydrides thereof which may be used include maleic acid, maleic anhydride, fumaric acid, itaconic acid, citraconic acid, glutaconic acid, mesaconic acid, ethylidenemalonic acid, vinylmalonic acid, allylmalonic acid, proplyidenemalonic acid, hydromuconic acid, pyrocinchonic acid, vinylsuccinic acid, allylsuccinic acid, etc. For purposes of the present specification and claims, the term "olefinic dicarboxylic acid and anhydride" will refer to a dicarboxylic acid containing only one ethylenic double bond and comprising only carbon, hydrogen and oxygen atoms. The furan and the olefinic dicarboxylic acid are condensed at temperatures ranging from about 0° up to about 200° C. or more and preferably in a range of from about 25° to about 100° C. The two starting materials can be admixed per se or, if so desired, solutions of the starting materials in substantially inert organic solvents such as n-pentane solutions, n-hexane solutions, benzene solutions, toluene solutions, ether solutions, alcohol solutions, etc. may be admixed.

The product resulting from the aforementioned condensation, namely, an epoxy tetrahydrophthalic acid, anhydride or homolog thereof, is then further condensed with a halo-substituted cycloalkadienic compound to form the desired reaction product. For purposes of this invention, the term "halocycloalkadiene" as used in the specification and appended claims will refer to both mono- and polyhalo-substituted cycloalkadienes. Examples of the halo-substituted cycloalkadienes which may be used in the process of this invention include chloro-substituted 1,3-cyclopentadienes (hereinafter referred to as cyclopentadienes) such as 1-chlorocyclopentadiene, 2-chlorocyclopentadiene, 1,2-dichlorocyclopentadiene, 1,5-dichlorocyclopentadiene, 1,2,3-trichlorocyclopentadiene, 1,2,3,4-tetrachlorocyclopentadiene, 1,2,3,4,5-pentachlorocyclopentadiene, hexachlorocyclopentadiene; bromo-substituted cyclopentadienes such as 1-bromocyclopentadiene, 1,2-dibromocyclopentadiene, 1,2,3-tribromocyclopentadiene, 1,2,3,4-tetrabromocyclopentadiene, 1,2,3,4,5-pentabromocyclopentadiene, hexabromocyclopentadiene; chloro-substituted 1,3-cyclohexadienes (hereinafter referred to as cyclohexadienes) such as 1-chlorocyclohexadiene
1,2-dichlorosyclohexadiene,
1,3-dichlorocyclohexadiene,
4,5-dichlorocyclohexadiene,
4,6-dichlorocyclohexadiene,
1,2,3-trichlorocyclohexadiene,
1,2,4,-trichlorocyclohexadiene,
1,2,3,4-tetrachlorocyclohexadiene,
pentachlorocyclohexadiene,
hexachlorocyclohexadiene,
octachlorocyclohexadiene;

bromo-substituted cyclohexadienes such as 1-bromocyclohexadiene,
1,2-dibromocyclohexadiene,
1,3-dibromocyclohexadiene,
4,5-dibromocyclohexadiene,
4,6-dibromocyclohexadiene,
1,2,3-tribromocyclohexadiene,
1,2,4-tribromocyclohexadiene,
1,2,3,4-tetrabromocyclohexadiene,
pentabromocyclohexadiene,
hexabromocyclohexadiene,
octabromocyclohexadiene, etc.

In addition, it is also contemplated within the scope of this invention that the cyclopentadienes and cyclohexadienes containing more than one species of halogen substituents may also be used, although not necessarily with equivalent results, such compounds including 1-chloro-2-bromocyclopentadiene,
1,2-dichloro-5,5-dibromocyclopentadiene,
2,3-dichloro-5,5-dibromocyclopentadiene,
1-chloro-2-bromocyclohexadiene,
1,2-dichloro-3-bromocyclohexadiene,
1,2-dichloro-3,4-dibromocyclohexadiene, etc.

The condensation reaction between the epoxy tetrahydrophthalic acid, anhydride or homolog thereof and the halo-substituted cycloalkadiene is of the Diels-Alder type and may be effected at elevated temperatures in the range of from about 50° to about 250° C., the preferred range being from about 100° to about 200° C. In addition, pressures ranging from atmospheric up to about 100 atmospheres or more may be used, the pressure being sufficient so as to maintain a major portion of the reactants in the liquid phase. If so desired, this condensation may be effected in the presence of an inert organic solvent including aromatic solvents such as benzene, toluene, o-xylene, m-xylene, p-xylene, ethylbenzene, etc.; saturated paraffins and cycloparaffins such as n-pentane, n-hexane, n-heptane, cyclopentane, methylcyclopentane, cyclohexane, cycloheptane, etc.; low molecular weight alcohols such as methyl alcohol, ethyl alcohol, propyl alcohol, isopropyl alcohol, butyl alcohol, etc.; ethers such as dimethyl ether, diethyl ether, dipropyl ether, etc.; or acetone, acetic acid, etc., the aromatic solvents usually comprising the preferred solvents.

The halo-substituted polyhydroepoxymethanonaphthalenedicarboxylic acid or anhydride thereof which is prepared according to the above paragraph is then treated with an oxygenated acid, either inorganic or organic in nature, to prepare the desired product. Examples of oxygenated acids which may be used include inorganic acids such as sulfuric acid, polyphosphoric acid, triphosphoric acid, tetraphosphoric acid, orthophosphoric acid, pyrophosphoric acid, etc.; organic acids such as methanesulfonic acid, ethanesulfonic acid, benzenesulfonic acid, toluenesulfonic acid, etc. The treatment of the halo-substituted polyhydroepoxymethanonaphthalenedicarboxylic acid or anhydride thereof with the aforementioned acid is usually effected at elevated temperatures ranging from about 30° up to about 150° C. or more and preferably in a range of from about 50° to about 100° C. The resulting product which comprises the desired compound utilizable as a monomer for the preparation of flame retardant plastics or resins is generically referred to as a halo-substituted dihydroxypolyhydromethanonaphthalenedicarboxylic acid.

To illustrate the aforementioned steps hereinbefore described, the preparation of 1,4-dihydroxy - 5,6,7,8,9,9-hexachloro-1,2,3,4,4a,5,8,8a-octahydro-5,8 - methano-2,3-naphthalenedicarboxylic acid is illustrated in a typical reaction scheme hereinafter set forth utilizing furan and maleic anhydride as the starting materials, treating the first condensation product with hexachlorocyclopentadiene and thereafter treating the resultant product with sulfuric acid.

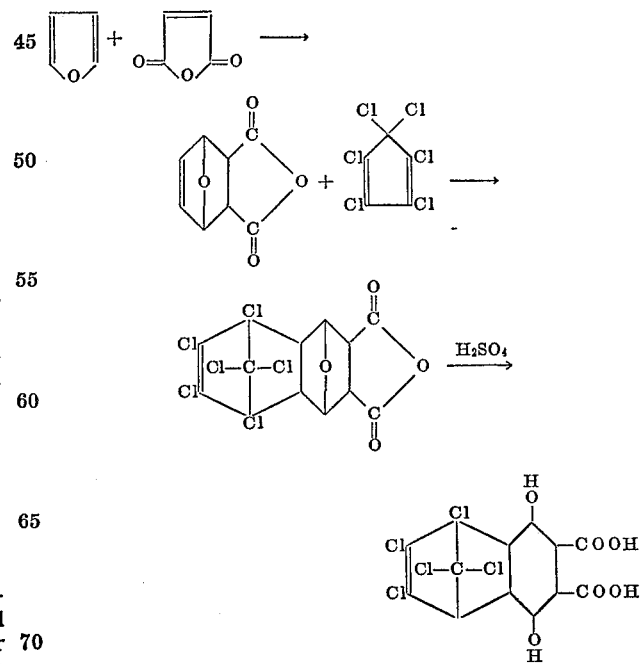

The process of the present invention may be effected in any suitable manner and may comprise either a batch or continuous type operation. For example, when a batch type operation is used, a quantity of the furan and the olefinic dicarboxylic acid or anhydride thereof is placed in an appropriate apparatus, preferably a condensation vessel, at the proper operating conditions of temperature and allowed to condense. Following this, the epoxy tetrahydrophthalic acid or anhydride is recovered by conventional means such as fractional distillation, crystallization etc. and placed in a second condensation apparatus along with a halo-substituted cycloalkadiene, this condensation being effected in the presence of an inert organic solvent. The condensation vessel is heated to the desired temperature and, after a predetermined residence time, the vessel is cooled and the halo-substituted polyhydroepoxymethanonaphthalenedicarboxylic acid or anhydride thereof is separated from the unreacted starting materials by conventional means and recovered. This product is then treated with an oxygenated acid in an appropriate vessel at temperatures ranging from about 50° to about 100° C. and the desired product, after completion of the desired residence time, is recovered.

It is also contemplated within the scope of this invention that the process may be effected in a continuous manner. When such type of operation is used, the starting materials comprising the furan and the olenfic dicarboxylic acid or anhydride thereof are continuously charged to a reaction vessel maintained at the proper operating conditions of temperature and pressure. If so desired, this reaction may be effected in the presence of an inert organic solvent such as a low molecular weight ether or alcohol. The resultant epoxy tetrahydrophthalic anhydride is continuously withdrawn from the reaction vessel and charged to a second condensation vessel which is also maintained at the proper operating conditions of temperature and pressure. In addition, the halo-substituted cycloalkadiene is continuously charged to this second reaction vessel which is maintained at the proper operating conditions of temperature and pressure through a separate line. Alternatively, the halo-substituted cycloalkadiene may be admixed with an inert organic solvent, thereafter further admixed with the epoxy tetrahydrophthalic anhydride and the mixture charged to the reactor in a single stream. The resultant halo-substituted polyhydroepoxymethanonaphthalenedicarboxylic acid or anhydride is continuously withdrawn and charged to a treating vessel wherein it undergoes treatment with an acid of the type hereinbefore set forth in greater detail at temperatures ranging from 50° to about 100° C. The reactor effluent is continuously withdrawn from this vessel and charged to a separator wherein the desired product comprising the halo-substituted dihydroxypolyhydromethanonaphthalenedicarboxylic acid is separated from unreacted starting materials and recovered. It is to be understood that in a continuous process of this type in each case the reactor effluent from the first and second condensation zones, as well as the third treating zone, is subjected to a separation step wherein the desired product from each zone is separated from the unreacted starting materials in each step, the latter being recycled to form a portion of the feed stock to each respective reaction zone.

Examples of compounds which may be prepared according to the process of this invention include 1,4-dihydroxy-5,8-dichloro-1,2,3,4,4a,5,8,8a-octahydro-5,8-methano-2,3-naphthalenedicarboxylic acid, 1,4-dihydroxy-5,8-dibromo-1,2,3,4,4a,5,8,8a-octahydro-5,8-methano-2,3-naphthalenedicarboxylic acid, 1,4-dihydroxy-6,7-dichloro-1,2,3,4,4a,5,8,8a-octahydro-5,8-methano-2,3-naphthalenedicarboxylic acid, 1,4-dihydroxy-6,7-dibromo-1,2,3,4,4a,5,8,8a-octahydro-5,8-methano-2,3-naphthalenedicarboxylic acid, 1,4-dihydroxy-5,6,7,8-tetrachloro-1,2,3,4,4a,5,8,8a-octahydro-5,8-methano-2,3-naphthalenedicarboxylic acid, 1,4-dihydroxy-5,6,7,8-tetrabromo-1,2,3,4,4a,5,8,8a-octahydro-5,8-methano-2,3-naphthalenedicarboxylic acid, 1,4-dihydroxy-5,6,7,8,9,9-hexachloro-1,2,3,4,4a,5,8,8a-octahydro-5,8-methano-2,3-naphthalenedicarboxylic acid, 1,4-dihydroxy-5,6,7,8,9,9-hexabromo-1,2,3,4,4a,5,8,8a-octahydro-5,8-methano-2,3-naphthalenedicarboxylic acid.

It is to be understood that the aforementioned compounds are only representative of the class of compounds which may be prepared and that the present process is not necessarily limited thereto.

The monomers thus produced may be utilized as components of finished plastics or resins which, as hereinbefore set forth, possess the desired physical properties of being fire resistant or flame retardant. These monomers may be polymerized to form unsaturated halogenated polyesters, or they may be copolymerized via the dicarboxylic acid or anhydride functions with di-, tri-, etc. hydroxy compounds such as ethylene glycol, propylene glycol, butylene glycol, diethylene glycol, dipropylene glycol, hydroquinone, catechol, resorcinol, etc., glycerol, pyrogallol, phloroglucinol, etc, and via the dihydroxy function with di-, tri-, etc. carboxylic acids such as oxalic acid, malonic acid, succinic acid, glutaric acid, etc., tricarballylic acid, etc., phthalic acids, mellitic acids, etc. and anhydrides such as maleic anhydride, succinic anhydride, glutaconic anhydride, phthalic anhydride, etc. to form polyesters. These polyesters will contain an unsaturated portion of the molecule which will allow further polymerization, said further polymerization being initiated by peroxide or air drying. The polyesters thus prepared may comprise low molecular weight unsaturated compounds which can then be epoxidized and used as stabilizing plasticizers for polyvinyl chloride resins. It is also contemplated that the unsaturated polyester may be further reacted with vinyl monomers such as styrene to form compounds which are utilizable as thermal setting resins. If the polyester resin contains —OH terminals, it may be admixed with a diisocyanate such as, for example, tolylene diisocyanate to form polyurethane intermediates which may then be foamed by the addition of a foaming agent such as water, tertiary alcohols, etc. to form the desired polyurethane foams. The preparation of the polyester plastic or resin may be effected at temperatures ranging from room temperature up to about 300° C. for a residence time ranging from a few minutes up to about 25 hours, the residence time being inversely proportional to the temperature at which the reaction is carried out.

The following examples are given to illustrate the process of the present invention which, however, are not intended to limit the generally broad scope of the present invention in strict accordance therewith.

EXAMPLE I

In this example 2 moles of maleic anhydride are dissolved in about 600 cc. of anhydrous ethyl ether at a temperature of about 30° C. Following this, 2 moles of furan are then added. The resulting pale yellow solution is allowed to stand for 16 hours whereby the product is deposited as well-formed crystals. The crystals are separated from the solution, said crystals comprising 3,6-epoxy-1,2,3,6-tetrahydrophthalic anhydride.

The 3,6 - epoxy - 1,2,3,6 - tetrahydrophthalic anhydride which is prepared according to the above paragraph is then mixed with a molecular proportion of hexachlorocyclopentadiene in a xylene solvent. This mixture is heated to a temperature of about 150° C. and maintained thereat for a period of about 2 hours. At the end of this time the flask and contents thereof are allowed to cool to room temperature and the product is subjected to fractional crystallization. The desired product comprising 5,6,7,8,9,9 - hexachloro - 1,2,3,4,4a,5,8,8a - octahydro-1,4 - epoxy-5,8-methano-2,3-naphthalenedicarboxylic acid anhydride is separated and recovered.

The acid anhydride prepared according to the above paragraph is then placed in a reaction vessel along with an excess of sulfuric acid. The mixture is heated to a temperature of about 50° C. for a period of about 2 hours. At the end of this time the flask and contents thereof are allowed to cool to room temperature and the desired product comprising 1,4 - dinhydroxy - 5,6,7,8,9,9-hexachloro - 1,2,3,4,4a,5,8,8a - octahydro - 5,8 - methano-2,3-naphthalenedicarboxylic acid is separated and recovered by fractional crystallization.

EXAMPLE II

In this example 2 moles of maleic anhydride are dissolved in anhydrous ethyl ether and 2 moles of furan are added thereto. The solution is allowed to stand for 16 hours during which time crystals are formed. The crystals are separated from the mother liquor and purified.

Following this, equimolar proportions of the anhydride and hexabromocyclopeantadiene are placed in a condensation flask along with xylene and heated to a temperature of 150° to 165° C. for a period of about 6 hours. At the end of this time the flask and contents are cooled to room temperature and the condensation product comprising 5,6,7,8,9,9 - hexabromo - 1,2,3,4,4a,5,8,8a-octahydro - 1,4 - epoxy - 5,8 - methano - 2,3 - naphthalenedicarboxylic acid anhydride is separated and recovered by fractional crystallization.

The anhydride prepared according to the above paragraph is placed in a reaction vessel along with an excess of sulfuric acid and treated in a manner similar to that set forth in Example I above. The desired product comprising 1,4 - dihydroxy - 5,6,7,8,9,9-hexabromo-1,2,3,4,4a, 5,8,8a - octahydro-5,8-methano-2,3-naphthalenedicarboxylic acid is separated and recovered by fractional crystallization.

EXAMPLE III

In this example 5,6,7,8,9,9-hexachloro-1,2,3,4,4a,5,8, 8a - octahydro - 1,4 - epoxy-5,8-methano-2,3-naphthalenedicarboxylic acid anhydride which is prepared according to the process set forth in Example I above is treated with various acids such as phosphoric acid and methanesulfonic acid at temperatures ranging from 50° to 100° C., the desired product comprising 1,4-dihydroxy-5,6,7,8, 9,9-hexachloro-1,2,3,4,4a,5,8,8a-octahydro-5,8 - methano-2,3-naphthalenedicarboxylic acid being recovered in each case.

EXAMPLE IV

To illustrate the use of an acid of the type prepared according to the above paragraphs, a polyester resin may be prepared by charging equimolar proportions of ethylene glycol and diethylene glycol to a flask which is then swept with nitrogen and heated to a temperature between 90° and 100° C. Following this 1,4-dihydroxy-5,6,7,8,9, 9-hexachloro - 1,2,3,4,4a,5,8,8a-octahydro-5,8 - methano-2,3-naphthalenedicarboxylic acid and maleic anhydride are added to the flask. The flask is then heated to a temperature of about 160° C. and maintained at a temperature in the range of from about 165° to about 175° C. for a period of about 6 hours. At the end of the desired residence time the resin is recovered and separated from unreacted starting materials.

EXAMPLE V

In this example a polyester resin may be prepared by charging ethylene glycol to a reaction vessel which is thereafter swept with nitrogen. The flask is heated to a temperature in the range of from about 90° to about 100° C. and some 1,4-dihydroxy-5,6,7,8,9,9-hexabromo-1,2,3,4,4a,5,8,8a - octahydro - 5,8 - methano-2,3-naphthalenedicarboxylic acid is added thereto. Following this, diethylene glycol which is preheated to a temperature of about 80° C. is added thereto followed by the addition of more of the acid. The temperature of the flask is then raised and maintained in a range of from about 165° to about 175° C. At the end of about 8 hours maleic anhydride is added and the reaction is allowed to proceed for an additional period of 8 hours. At the end of this time the resin is recovered and is further treated by the addition of styrene. The mixture is heated to a temperature of about 70° to about 90° C. and maintained thereat for a period of about 2 hours. At the end of this time the polyester resin resulting from the admixture of the styrene and the previously prepared resin is recovered.

I claim as my invention:

1. A process for the preparation of a halo-substituted 1,4 - dihydroxypolyhydromethano-2,3-naphthalene-dicarboxlic acid in which the nuclear carbon atoms in the 1, 4, 4a and 8a ring positions are saturated which comprises condensing furan with maleic acid or maleic anhydride at condensation conditions, further condensing the resultant epoxy tetrahydrophthalic acid or anhydride thereof with a halocycloalkadiene containing 5 or 6 carbon atoms in the ring at condensation conditions, treating the resultant halo-substituted polyhydroepoxymethanonaphthalenedicarboxylic compound with an oxygenated acid from the group consisting of sulfuric acid, phosphoric acids, and sulfonic acids, and recovering the resultant halo-substituted 1,4 - dihydroxypolyhydromethano - 2,3-naphthalene dicarboxylic acid.

2. A process for the preparation of a halo-substituted 1,4 - dihydroxpyolyhydromethano-2,3-naphthalene dicarboxylic acid in which the nuclear carbon atoms in the 1, 4, 4a and 8a ring positions are saturated which comprises condensing furan with maleic anhydride at a temperature of from about 0° to about 200° C., further condensing the resultant epoxytetrahydrophthalic anhydride with a halocycloalkadiene containing 5 or 6 carbon atoms in the ring at a temperature of from about 50° to about 250° C., thereafter treating the resultant halo-substituted polyhydroepoxymethanonaphthalenedicarboxylic anhydride with an oxygenated acid from the group consisting of sulfuric acid, phosphoric acids, and sulfonic acids at a temperature of from about 30° to about 150° C., and recovering the resultant halo-substituted 1,4-dihydroxypolyhydromethano-2,3-naphthalenedicarboxylic acid.

3. The process of claim 2 further characterized in that said halocycloalkadiene is hexachlorocyclopentadiene or hexabromocyclopentadiene.

4. The process of claim 3 further characterized in that said oxygenated acid is sulfuric acid.

5. The process of claim 3 further characterized in that oxygenated acid is phosphoric acid.

6. The process of claim 3 further characterized in that said oxygenated acid is methane sulfonic acid.

References Cited

UNITED STATES PATENTS 2,733,248   1/1956   Lidov _____ 260—346.2
3,176,024   3/1956   Feichtinger et al. ___ 260—346.2

LORRAINE A. WEINBERGER, Primary Examiner.

P. J. KILLOS, Assistant Examiner.

U.S. Cl. X.R.

252—8.1; 260—346.6, 468